(12) United States Patent
Robakowski et al.

(10) Patent No.: US 9,061,924 B2
(45) Date of Patent: Jun. 23, 2015

(54) METHOD AND APPARATUS FOR REDUCING THE MINERAL SCALING POTENTIAL OF WATER USED IN A HEATED APPLIANCE

(75) Inventors: Edward Robakowski, Brecksville, OH (US); Mark J. Brotman, Burton, OH (US); Keith Brown, Solon, OH (US)

(73) Assignee: KINETICO INCORPORATED, Newbury, OH (US)

( * ) Notice: Subject to any disclaimer, the term of this patent is extended or adjusted under 35 U.S.C. 154(b) by 168 days.

(21) Appl. No.: 13/703,793

(22) PCT Filed: Jun. 22, 2011

(86) PCT No.: PCT/US2011/041450
§ 371 (c)(1),
(2), (4) Date: Dec. 12, 2012

(87) PCT Pub. No.: WO2011/163361
PCT Pub. Date: Dec. 29, 2011

(65) Prior Publication Data
US 2013/0082002 A1   Apr. 4, 2013

Related U.S. Application Data

(60) Provisional application No. 61/357,218, filed on Jun. 22, 2010.

(51) Int. Cl.
*C02F 1/42* (2006.01)

(52) U.S. Cl.
CPC ............. *C02F 1/42* (2013.01); *C02F 2001/425* (2013.01); *C02F 2209/03* (2013.01); *C02F 2209/06* (2013.01); *C02F 2209/40* (2013.01); *C02F 2301/043* (2013.01)

(58) Field of Classification Search
CPC ................. C02F 1/42; C02F 2001/425; C02F 2301/043; C02F 2209/06; C02F 2209/40; C02F 2209/03
See application file for complete search history.

(56) References Cited

U.S. PATENT DOCUMENTS 3,687,843 A * 8/1972 Emmett .......................... 521/26
4,943,371 A * 7/1990 Tsviatko et al. ............... 210/101
2004/0188352 A1   9/2004 Dey et al.
2010/0047134 A1   2/2010 Koch et al.

OTHER PUBLICATIONS

International Search Report & Written Opinion PCT/US11/41450; Published Oct. 10, 2011.

* cited by examiner

*Primary Examiner* — Matthew O Savage
(74) *Attorney, Agent, or Firm* — Tarolli, Sundheim, Covell & Tummino LLP

(57) ABSTRACT

A water treatment system includes a weak acid cation resin where a portion of the feed water is exposed to the resin and then blended with untreated feed water to produce a stream of water with reduced mineral scaling and potential. Feed water is split into a first fluid stream, fed to a bypass conduit and a second fluid stream that is conveyed through a weak acid cation treatment bed. After passing through the bed, the treated fluid is combined with the bypass fluid stream to produce a blended feed water at the outlet. The ratio of the bypass fluid stream and treated fluid stream is a function of pH and L.S.I. A controller and associated sensors may control the relative flow rates between the bypass fluid stream and the treated stream to maintain a predetermined water parameter such pH, L.S.I., etc. within a predetermined range.

23 Claims, 3 Drawing Sheets

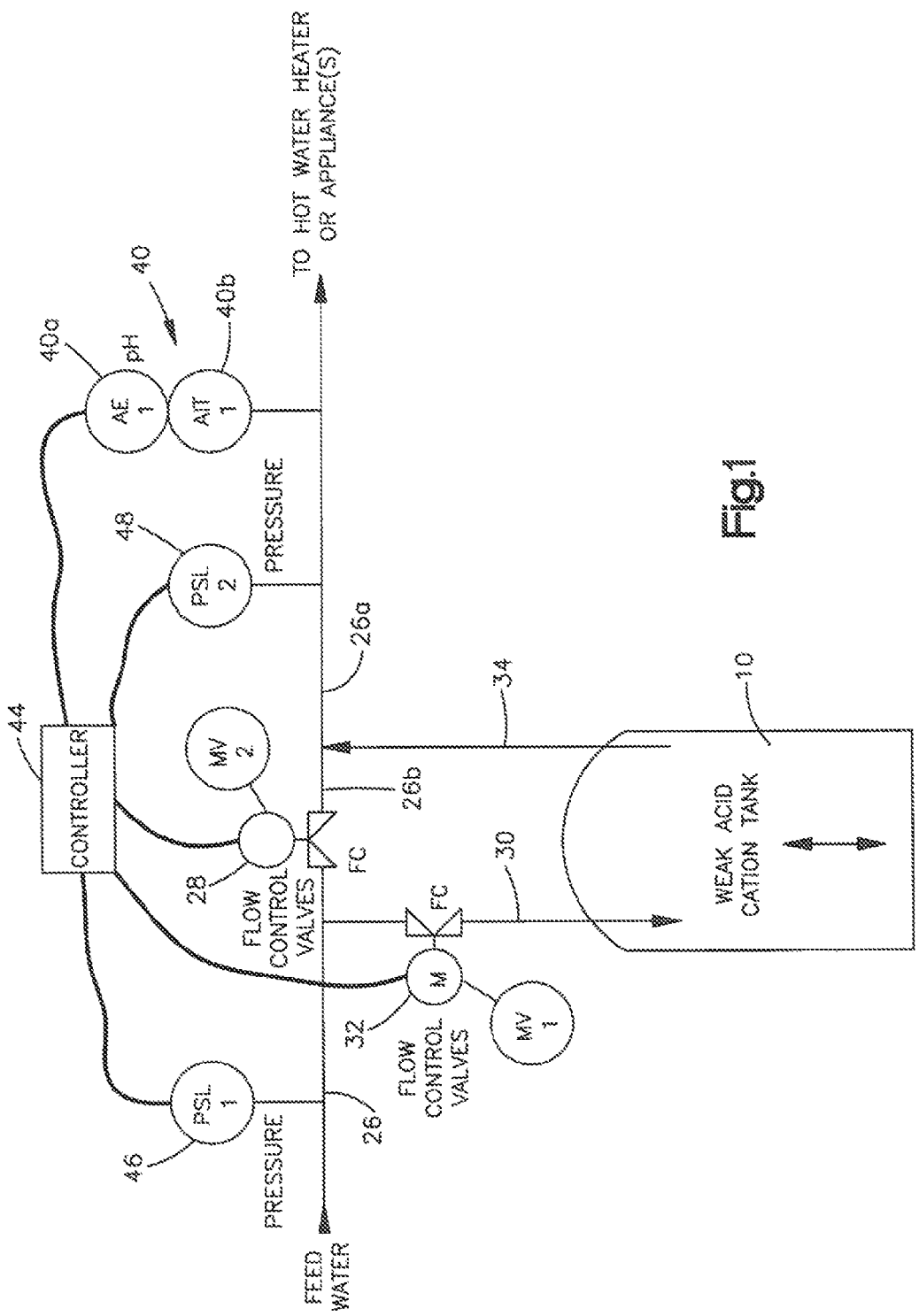

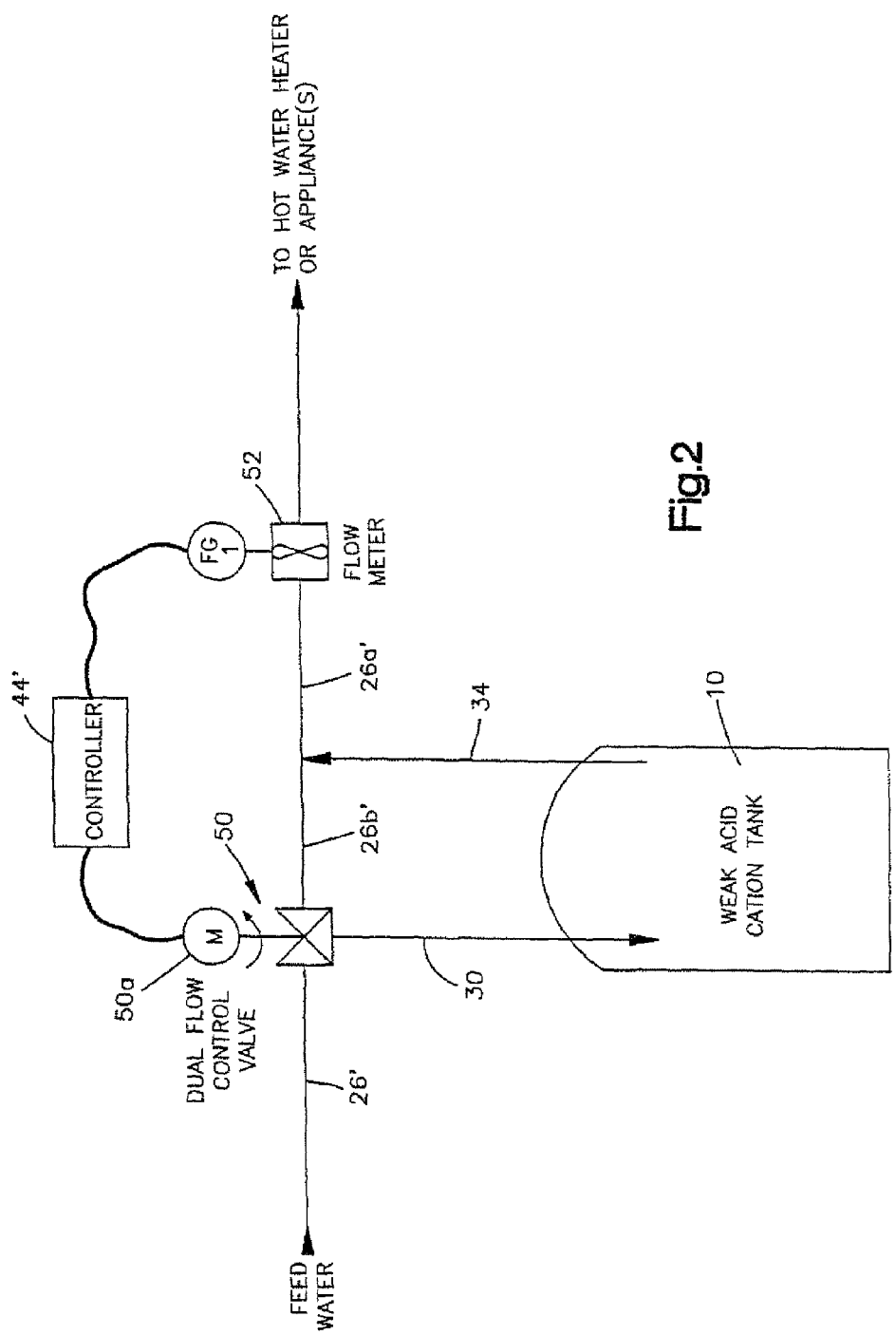

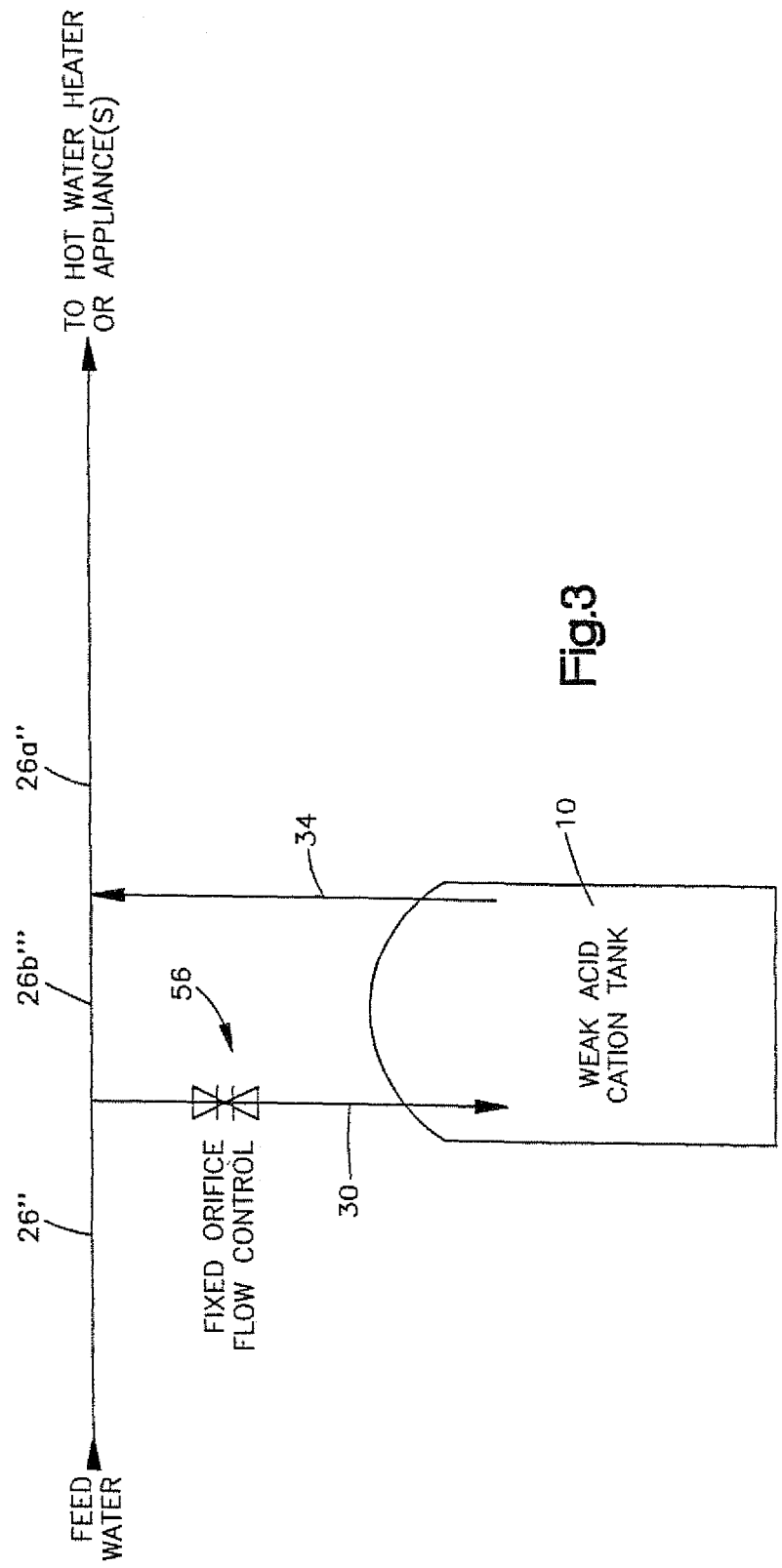

METHOD AND APPARATUS FOR REDUCING THE MINERAL SCALING POTENTIAL OF WATER USED IN A HEATED APPLIANCE

RELATED APPLICATIONS

This application claims priority to U.S. Provisional Application No. 61/357,218, filed Jun. 22, 2010, the entirety of which is incorporated herein by reference.

TECHNICAL FIELD

The invention is drawn to the area of water treatment, more specifically to the reduction of mineral scaling potential from feed waters for heated appliances in residential and commercial applications.

BACKGROUND OF INVENTION

The scaling potential of any given water is dependent upon complex chemical and physical interactions of the various constituents dissolved therein. Scaling of water bearing appliances specifically those which employ heat as part of their function typically manifests itself by a hard incrustation comprised primarily of calcium carbonate ($CaCO_3$). This compound is formed by the following chemical reaction:

$$Ca(HCO_3)_2 + heat \rightarrow CaCO_3 \downarrow + CO_2 + H_2O$$

It usually occurs directly on heat transfer surfaces resulting in increased energy consumption, failure of the heating element, or plugging of conduits and orifices. There are many methods known in the art to eliminate or inhibit this reaction. Perhaps the most well known and practiced treatment technique is ion exchange water softening.

The formation of calcium carbonate particles follows a stepwise progression which includes the following elements:
1) Saturation with respect to calcium;
2) A shift in the alkalinity equilibrium to favor the formation of the carbonate ion;
3) Nucleation; and
4) Particle formation It is well known in the art that when operated in the hydrogen form, a weak acid cation resin removes cations that are associated with alkalinity. The degree of removal and ultimate working capacity of the media is dependent primarily upon the Hardness:Alkalinity ratio (H/A), flow rate and temperature. Chemically the process can be depicted as follows:

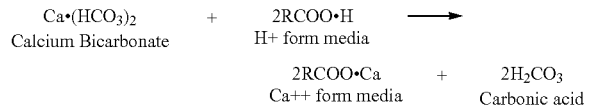

Carbonic Acid readily disassociates to water and carbon dioxide.

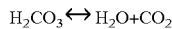

The changes that occur during this process have the effect of reducing the Calcium content of the water, shifting the carbonate, bicarbonate, carbonic acid equilibrium to favor the $CO_2$ species, and lowering the pH. Generally these changes can be quantified in a predictable manner. In order to utilize this information and apply it in the treatment of water a number of "indices" have been developed to predict the tendency of a particular water to form a Calcium Carbonate scale. These have been collectively referred to as Calcium Carbonate Saturation Indices. Among the most popular are: The Langelier Saturation Index (LSI), the Ryzner Stability Index (RSI), the Puckorius Scale Index (PSI), and the Calcium Carbonate Precipitation Potential (CCPD). All are based on determining the equilibrium state of the water in question. In general: Water that is oversaturated with respect to Calcium Carbonate will tend to precipitate $CaCO_3$. Water that is under-saturated with respect to Calcium Carbonate will tend to dissolve $CaCO_3$. Water in equilibrium with Calcium Carbonate will have neither $CaCO_3$ precipitating or dissolving tendencies. These models are far from perfect, however they do provide a means to gauge the effect of changing water chemistry in order to achieve a desired finished water quality. An example of one such index and its significance is shown below:

Langelier Saturation Index (LSI)

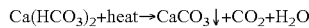

Where:
pH=The measured pH of the water
pHs=The pH at saturation and is defined as:

$$pHs=(9.3+A+B)-(C+D)$$

Where:
$A=(Log_{10}[TMS]-1)/10$
$B=^{-}13.12 \times Log_{10}(°C.+273)+34.55$
$C=Log_{10}[Ca^{+2} \text{ as } CaCO_3]-0.4$
$D=Log_{10}[\text{Alkalinity as } CaCO_3]$ Significance
LSI>0—Water is supersaturated and tends to precipitate a scale layer of $CaCO_3$
LSI=0—Water is in equilibrium with $CaCO_3$; a scale layer of CaCO3 is neither precipitated nor dissolved
LSI<0—Water is under-saturated, tends to dissolve solid $CaCO_3$ For over 50 years, water softeners have been used in residential and commercial applications to remove or reduce the hardness (dissolved Ca and Mg) in the water. This produced the benefit of eliminating or reducing scale formation in water heaters and appliances, eliminating or reducing soap scum formation which allows for more efficient use of soaps and detergents, thereby simplifying cleaning tasks in the home, in the laundry and in personal grooming. The hardness removal or reduction has been historically provided by water treatment systems that utilized ion exchange technology. U.S. Pat. Nos. 4,337,153 and 5,300,230 describe systems that are typical of many that have been applied to this technology over the years. In general, an ion exchange water softener removes dissolved Calcium and Magnesium ions from the water and exchanges them for equivalent number of Sodium or Potassium ions. Sodium and Potassium ions do not form the same detrimental types of scale and scum as do hardness ions. Once an ion exchange system has removed a predetermined quantity of Calcium and Magnesium, it can no longer remove any more hardness and has reached its capacity. To allow it to continue to remove hardness it must be regenerated by introducing excess sodium or potassium ions to drive off the removed hardness ions. This process produces a discharge waste that includes not only the removed hardness ions but also excess sodium or potassium ions. This discharge also includes the chloride salts of these ions and is generally called a "brine" waste. Using this process, these products have provided home and business owners the benefits of soft water for years, efficiently and effectively.

Predominantly over the last decade, concerns over the brine discharge have begun to develop. These are based on the potential for these discharged brine wastes to eventually end up in our waterways, rivers, lakes etc and also in the discharges from waste water treatment plants. The position held by some is that these brine wastes cause an elevated chloride and or sodium level in either the waterways or the wastewater treatment plant thereby making those waters less desirable for their intended uses such as recycling and/or crop irrigation. These issues have produced legislation that in some parts of the country have outlawed the use of ion exchange water softeners.

One effective means of continuing to provide soft water to a home or business even in these restricted areas is to provide an ion exchange system but to perform the regeneration in another location so that there is no local waste brine discharge. In those cases, the tanks would be removed and taken to a facility where a dedicated waste pipe can take the waste brine discharge to an acceptable location such as the ocean or controlled evaporation ponds etc. While this is possible and is being effectively applied today, the home or business owner is inconvenienced by the necessity of having to open their home or business to service people on a frequent basis and the movement of the somewhat bulky tanks in and out of the home or business is difficult, time consuming, and can cause possible property damage.

Alternatives to sodium or potassium chloride regenerants have been proposed. For example, Kunin et al, U.S. Pat. No. 6,340,712 teaches a solution for the regeneration of a Strong Acid Cation Exchange Resin comprised of potassium acetate, or potassium formate with citric acid and octyl phenol ethoxylate. Similarly, Cole, U.S. Pat. No. 4,298,477 employs an ionizable salt of morpholine. Both of these alternatives do not lend themselves as a comparable substitute for residential or commercial applications in terms of cost, availability or use.

Additionally, many non-ion exchange based systems or devices have been developed. U.S. Pat. Nos. 4,299,700 and 4,235,698 are examples of technologies presented to provide home and business owners with alternatives to ion exchange water softening. The results produced by these and many other such devices are questionable and reports vary widely about their effectiveness. In any case they claim to provide some degree of scale reduction or prevention and at least some degree of other soft water benefits such as use of less soaps, easier household cleaning etc. These alternative systems or devices utilize a wide variety of technologies including magnetic fields, electromagnetic fields, template assisted nano crystal formation, and others. It should also be noted that using industry accepted water testing methods (Standard Methods for the Examination of Water and Wastewater) none of these devices produces a measurable difference in the water chemistry make up after processing.

It has also been known for years that there are alternative ion exchange systems that can remove hardness. U.S. Pat. Nos. 4,235,715; 3,458,438; 3,423,311; 2,807,582, 6,746,609; and 7,632,412 show examples of systems where a weak acid cation (WAC) resin can be used to remove hardness and alkalinity in the water. It should be noted that the application of these types of resins have been predominately industrial in nature, i.e. applicable for high pressure Boiler feed water and Open Recirculating Cooling Tower Systems. Additionally they consist of multiple process steps, are designed for complete hardness removal, employ a decarbonation step, and are designed as a regenerable system. Therefore, a need exists for an efficient, simple and cost effective method of reducing scale in residential and commercial applications.

SUMMARY OF THE INVENTION

What is provided is a water treatment system and method including weak acid cation resin where a portion of the water that is desired to be treated (feed water) is exposed to a weak acid cation resin and then blended with the feed water to produce a stream of water with a balanced water chemistry sufficient to reduce the mineral scaling potential.

According to one embodiment of the invention, a method is disclosed which includes the steps of providing an inlet for receiving feed water, conveying a portion of the feed water to an inlet to a weak acid cation resin and bypassing the remaining portion of the feed water directly to an outlet. After passing through the weak acid cation resin, the treated feed water stream is recombined with the bypassed fluid stream, thereby delivering a blended feed water to the outlet. The amount of feed water delivered to the weak acid resin is adjusted in order to arrive at a predetermined Langelier Saturation Index (L.S.I.). The preferred L.S.I. range for the feed water at the outlet is −0.6 to −1.4.

According to a further feature of the invention, the $CO_2$ content of the blended feed water delivered to the outlet is allowed to increase to a level that is greater than the $CO_2$ content of the feed water received at the inlet. In a more preferred embodiment, the $CO_2$ content of the blended feed water is at least twice the $CO_2$ content of the incoming feed water.

According to an additional feature of the invention, the portion of the feed water fed to the weak acid cation resin is preferably fed in a downflow direction. Alternately, the feed water to be treated is conveyed in the upflow direction and the weak acid cation resin comprises a fluidized bed.

According to another embodiment, a water treatment apparatus and method are disclosed which provides a feed water inlet for delivering water to a main feed conduit. A bypass conduit and branch conduit communicate with the main feed conduit. The branch conduit communicates a portion of the feed water from the main conduit to a treatment tank containing a weak acid cation resin. The bypass conduit bypasses the other portion of the feed water around the treatment tank. The feed water in the bypass conduit and the treated feed water leaving the weak acid cation resin are recombined and delivered to an outlet. According to a feature of this embodiment, the ratio of untreated feed water to treated water at the outlet is a function of the pH of the blended water at the outlet.

According to a feature of this embodiment, a first control valve in the bypass conduit controls the flow rate of untreated feed water around the treatment tank and a second flow control valve controls the rate of flow of feed water to be treated by the weak acid cation tank.

According to a further feature, the control valves are adjustable and are preferably motor driven.

According to a further feature, a pH sensor is used to sense the pH at the outlet and a controller responsive to the sensor operates the first and second flow control valves in order to provide a blended feed water having a predetermined pH.

In a more preferred embodiment, the pressure of feed water at the inlet and blended water at the outlet is monitored by pressure sensors and the controller, in response to the pressure sensors, controls the degree of opening in the first and second flow control valves.

According to one preferred method for reducing the mineral scaling potential in feed water for a heated appliance, the following steps are disclosed. The L.S.I. of the available feed water is first determined. An inlet is provided for receiving the inlet feed water stream and valving is used to split the feed water inlet stream into a bypass inlet stream a stream to be treated. The stream to be treated is conveyed to a weak acid cation resin to produce a treated fluid stream. The treated fluid stream is combined with the bypass fluid stream to produce a blended feed water stream that is conveyed to an outlet. A parameter such as flow rate, pH or L.S.I. of the blended water stream is monitored and this information is used to adjust the valving to maintain a constant ratio between the bypass inlet stream and the stream to be created so that a predetermined L.S.I. is maintained at the outlet. Alternately, the ratio between the treated and bypass fluid streams are adjusted so that a predetermined L.S.I. is maintained for the water after it is heated by the heating appliance.

In the preferred method, the L.S.I. range for the blended feed water at the outlet is −0.6 to −1.4. Alternately, the L.S.I. range for the feed water heated by the appliance is 0 to CO −0.75.

In the exemplary embodiment of the invention, the CO2 level in the blended feed water at the outlet is greater than the CO content of the incoming feed water. Unlike the prior art, the present invention utilizes the increased CO2 content of the blended feed water to an advantage.

Accordingly, it is the object of the present invention to provide a simpler and more efficient process for the control of scaling potential than that of the prior art.

Additional features of the invention will become apparent and a fuller understanding obtained by reading the following detailed description made in connection with the accompanying drawings.

BRIEF DESCRIPTION OF DRAWINGS

The foregoing and other features and advantages of the present invention will become apparent to those skilled in the art to which the present invention relates upon reading the following description with reference to the accompanying drawings, in which:

FIG. 1 is a schematic illustration of a treatment system and associated control for treating feed water prior to being delivered to a hot water heater or other appliance;

FIG. 2 illustrates another embodiment of a treatment system for pre-treating a portion of feed water being delivered to a hot water heater or other appliance; and, FIG. 3 illustrates a third embodiment of a treatment system and control.

DESCRIPTION OF PREFERRED EMBODIMENTS

A water treatment method of the present invention in which a portion of the feed water to a heated appliance is side streamed and passed through a weak acid cation exchange resin in the hydrogen form. The effect of which is a reduction of a portion of the hardness bearing mineral content, an equilibrium shift of the alkalinity constituents to favor the formation and retention of dissolved carbon dioxide, and a subsequent lowering of the pH.

There exists several commercially available resins suited for such a purpose, such as Purolite 107E, a macroporous, acrylic, carboxylic resin available from The Purolite Company, Bala Cynwyd, Pa.; or Dowex MAC-3 available from The DOW Chemical Company, Midland Mich.

In order to achieve the desired water chemistry adjustment, the water is then blended in appropriate proportions or ratios by devices known to those skilled in the art. There are several methods that can be used to control the ratio in the blending process of the feed water to the WAC processed water. A key component of the control strategy is the water chemistry of the feed water. Depending on the type of control scheme used, this data, at a minimum will be used to determine if the water treatment apparatus is being applied within its working design parameters, or in a different control scheme, it can be used to set the actual mix ratio and to predict the useful life of the WAC resin in the system. It should also be understood that measurable benefits can be achieved over what may be a broad range of water chemistry adjustments, and that the method of control chosen can affect the range of adjustment.

Freshly regenerated WAC in the hydrogen form can produce an effluent water pH in the 3 to 4 range. This low level pH could harm household appliances, plumbing, irritate skin etc, so there will need to be some fail safe control function added to any control scheme designed for this application. Anywhere a valve is positioned in the plumbing where a malfunction could alter the ratio of flow between the WAC tank and the feed water bypass producing a mix too low in pH there will need to be a means included to stop the flow through the WAC tank and alarming the homeowner that a service call is required.

It should be understood that the functionality or effectiveness of the WAC resin bed will change over time as it is exposed to the feed water causing gradual depletion of the resin's capacity and kinetics, and therefore its ability to affect the blended water chemistry will also change. This happens because as the weak acid sites on the resin become occupied with divalent cations like Calcium and Magnesium through increasing contact with the feed water, there are less "new" or fresh sites available to provide the desired ion exchange. Therefore the feed water can pass through the WAC and have a greater chance of not making contact with a fresh ion exchange site, thereby allowing some of the water to leave the bed unaffected by the resin contact. Depending on the range of water chemistry adjustment desired, this change in the resin bed will require that whatever control scheme is chosen take this into account in its method of controlling the blend or mix.

FIG. 1 illustrates an apparatus constructed in accordance with one embodiment of the invention. The apparatus is used to pre-treat feed water prior to being received by a hot water heater or other appliance. The system includes a tank 10 containing a weak acid cation resin through which a feed water stream is conveyed in order to pre-treat that water stream. The treated water stream is then recombined with the main water stream before being delivered to the hot water heater or other appliance. In particular, a source of feed water is connected to a main feed conduit 26. The conduit 26 communicates with a bypass conduit 26b that includes a flow control valve 28 which may be a motor driven, adjustable valve. A WAC tank feed or branch passage 30, including another flow control valve 32 which may also be a motorized adjustable valve, communicates the passage 26 with an inlet to the weak acid cation tank 10. The feed water can be directed through the WAC tank in an upward or downward direction as shown by the arrow in FIG. 1. After traveling through the cation tank 10, the treated water exits the tank via conduit 34 and is recombined with the feed water in a combined feed water passage 26a. As a result, the water delivered to the hot water heater or other appliance is a mixture of feed water and water treated by the cation tank 10.

In order to control the mixing or blending of the feed water and treated water, a pH sensor 40 monitors the pH of the blended water stream. The pH sensor may comprise a conventional pH sensor and include an analog element 40a which serves as a sensor and an analog indicating transmitter 40b which may include a display.

A pH range or set point would be chosen at the time of installation and that set point would be used to set up a typical feed-back loop to control the automated flow control valves 28, 32 on both the WAC tank feed passage 30 and the bypass around the WAC tank (via passage 26b). A control circuit forming part of a controller 44 would adjust the flow through the WAC tank 10 and the bypass 26b around the WAC tank to achieve the desired pH range. A typical proportional integral derivative (PID) control would be built in to the circuit design to minimize "hunting" or oscillating caused by rapid valve movement and the associated downstream pH result. Pressure sensors 46, 48 would be included in the feed water supply and down steam of the WAC tank to control the degree of opening in both the flow control valves 28, 32. As a pressure drop is sensed by the feedback from both the sensors, the control 44 would open both the valves 28, 32 while keeping the same ratio of split stream. The pH control would coordinate with the pressure control to produce a mixed stream within the desired pH range, while still maintaining an acceptable pressure for the mixed streams intended use. For instance since the WAC system is being applied to the hot water feed in a home, the available water pressure in a shower is an important issue, as it not only might determine the flow in the shower, it could also affect the hot to cold water ratio blend which could cause problems in the shower. Those skilled in automated controls can envision numerous ways that this can be carried out using both off the shelf PLC controls or custom designed circuits. There are also many choices available for the pH probe 40, pressure sensors 46, 48 and controller 44 as well as the automated valves 28, 32. An advantage of the control scheme discussed in this section is that it will automatically adjust for the gradual depletion of the resin bed by using pH as its controlling function.

FIG. 2 illustrates an alternate embodiment of the invention. In this embodiment, a source of feed water is connected to an inlet conduit 26'. A dual flow control valve 50 determines the portion of feed water that is fed to the feed water bypass passage 26b' and the inlet conduit 30 of the weak acid cation tank.

In this embodiment, the blending ratio would be set at the installation based on the knowledge of the feed water chemistry and the desired chemistry of the blended stream. In one scheme this could be done by choosing a ratio of orifices that would control the flow (volume of feed water) sent to either the WAC tank 10 or bypassed around it via passage 26b'. It should be noted that while the size (diameter) ratio of the orifices can be set, the choice of the actual size of the orifice will need to consider the pressure drop created by them just as in the control scheme discussed in FIG. 1. One method of overcoming such a problem might be to have the orifices adjust in size while keeping the constant ratio by using the total combined flow through WAC resin and bypass as a means of choosing orifice size. In the preferred embodiment, the dual flow control valve 50 maintains a constant flow of blended water to the hot water appliance by adjusting the flow control so that the ratio between the feed water bypassing the tank and the feed water flowing through the tank remains constant. This can be achieved by using a flow control adjustment device such as that disclosed and claimed in International Application PCT/US2011/032212, filed Apr. 13, 2011, which is hereby incorporated by reference. The rotational movement of such an adjusting valve could be supplied by a feedback loop from a flow meter 52 to a rotary solenoid or stepping motor 50a controlled by controller 44'.

Finally, FIG. 3 illustrates a simplified embodiment. In this control scheme, one fixed orifice flow control 56 on the split stream feed 30 leading to the WAC tank 10 on some water sources may provide enough control to allow an acceptable yet varying split stream ratio between the passages 26b" and 30, producing an altered water chemistry, yet never allowing the mixed stream pH (in passage 26a") to drop into an unacceptable range.

It should be noted that, in all three embodiments, the weak acid cation tank 10 must be either periodically regenerated using known regeneration methods or periodically replaced with a tank containing freshly regenerated resin.

The following are examples of balancing water chemistry and scaling potential.

Example 1

An effluent stream of a Weak Cation Ion Exchange Resin (WAC) was blended in various proportions with a "Hard" water source, and the LSI derived.

| Hard:WAC | TDS | °C. | $Ca^{+2}$ as $CaCO_3$ | Alk. as $CaCO_3$ | A | B | C | D | pH | pHs | LSI |
|---|---|---|---|---|---|---|---|---|---|---|---|
| No Blend | 490 | 21 | 245 | 264 | 0.169 | 2.16 | 2.02 | 2.42 | 7.30 | 7.19 | 0.11 |
| 5:1 | 410 | 21 | 202.5 | 208 | 0.161 | 2.16 | 1.91 | 2.32 | 7.21 | 7.39 | −0.18 |
| 4:1 | 380 | 21 | 196.5 | 208 | 0.158 | 2.16 | 1.89 | 2.32 | 7.15 | 7.41 | −0.26 |
| 3:1 | 380 | 21 | 187.5 | 188 | 0.158 | 2.16 | 1.87 | 2.27 | 7.03 | 7.48 | −0.45 |
| 2:1 | 370 | 21 | 168.7 | 172 | 0.157 | 2.16 | 1.83 | 2.23 | 6.85 | 7.56 | −0.71 |

Results indicate that an increased negative LSI is achieved as a function of increased blending and corresponding water chemistry changes.

Example 2

Three small residential water heaters were configured to accept water from one of three sources:
1. Unit H—Hard Water only, no treatment (control)
2. Unit Alk A—the same Hard Water as the control, blended at a ratio of 2:1 Hard:WAC effluent
3. Unit Alk B—the same Hard Water as the control, blended at a ratio of 5.6:1 Hard:WAC effluent Each water heater tank was allowed to fill with its respective influent, reach operating temperature and then drain. This cycle was repeated 9 times per day for 28 days. During the course of operation, measurements of flow, pressure, volume throughput, and electrical usage were recorded. Samples of the feed water to the heater (In) and water exiting the heater after a 2 hr residence time (Out) were taken periodically and analyzed. A quantitative assessment of changes to the water chemistry (table 2) as well as scale formation and recovery from the system (table 2-A) was made.

TABLE 2

| Parameters | Hard In | Hard Out | Alk A 2:1 In | Alk A 2:1 Out | Alk B 5.6:1 In | Alk B 5.6:1 Out |
|---|---|---|---|---|---|---|
| Calcium as $CaCO3$ | 184 | 185 | 124 | 124 | 164 | 168 |
| TDS | 352 | 369 | 275 | 286 | 325 | 334 |
| pH @ 20° C. | 7.1 | 7.2 | 6.4 | 6.4 | 6.8 | 6.8 |
| Total Alkalinity | 249 | 245 | 162 | 160 | 213 | 211 |

TABLE 2-continued

| Parameters | Hard In | Hard Out | Alk A 2:1 In | Alk A 2:1 Out | Alk B 5.6:1 In | Alk B 5.6:1 Out |
|---|---|---|---|---|---|---|
| Temperature (F.) | 63.7 | 124.7 | 65.2 | 124.7 | 63.7 | 124.7 |
| LSI | −0.32 | 0.4 | −1.36 | −0.75 | −0.74 | −0.11 |
| CO2 mg/L | 39.5 | 31 | 129 | 127 | 67.5 | 67 |

TABLE 2-A

Total Scale recovered from System

| | Hard | Alk A 2:1 | Alk B 5.6:1 |
|---|---|---|---|
| Calcium as Ca (mg) | 2,798 | 121 | 511 |
| Magnesium as Mg (mg) | 160 | 50 | 102 |
| Total (mg) | 2,958 | 171 | 613 |
| % Reduction | — | 94.2% | 79.3% |

Example 3

A similar test was run as that presented in Example 2. Differences included a slightly different Hard water influent, and 3:1 blending ratio.

TABLE 3

| Parameters | HW In | HW Out | Alk 3:1 In | Alk 3:1 Out |
|---|---|---|---|---|
| Calcium as CaCO3 | 218 | 219 | 163 | 170 |
| TDS | 430 | 436 | 370 | 377 |
| pH @ 20° C. | 7.0 | 7.0 | 6.5 | 6.5 |
| Total Alkalinity | 265 | 265 | 192 | 203 |
| Temperature (F.) | 64.8 | 124.7 | 64.9 | 124.7 |
| LSI | −0.32 | 0.3 | −1.08 | −0.42 |
| CO2 mg/L | 53 | 53 | 121 | 128 |

TABLE 3A

Total Scale recovered from System

| | Hard | Alk 3:1 |
|---|---|---|
| Calcium as Ca (mg) | 1,927 | 217 |
| Magnesium as Mg (mg) | 127 | 33 |
| Total (mg) | 2,054 | 250 |
| % Reduction | — | 87.8% |

From the examples presented it can be seen that the present invention shows an improved process for reducing the scaling potential of water employed in this type of application. Specifically:

1) It is not necessary to remove all of the "hardness" associated with the water in order to achieve a non, or reduced scaling condition. Furthermore, contrary to the prior art, in order for scale reduction to occur, it is necessary to chemically balance the influent water sufficiently so as to assure a zero to negative LSI value after the heating process.

2) As can be seen from Tables 2 and 3, the relative amounts of CO2 in the blended waters were significantly elevated by the present invention. Without being bound to any particular theory, it is believed that it is neither necessary nor desirable to decarbonate the Weak Acid Cation effluent or blended feed water. Ideally the CO2 generated from the Weak Acid Cation will be left in the blended stream so as to achieve the desired chemical equilibrium in favor of the CO2 species. Additionally removal of CO2 would therefore require more of the treated water to be blended to achieve the desired scale potential reduction and subsequently reduce the usable capacity of the media.

3) By treating only a portion of the feed water, the ion exchange resin's capacity can be maximized, resulting in greater volume throughput and therefore eliminates the need for onsite regeneration to make the process economically viable. The accompanying chart shows an Estimate of a Whole House Hot Water Treatment based on 1 ft$^3$ of media, a 3,900 gal throughput capacity and various blending ratios.

| Blend Ratio Hard:WAC | WAC eff. (gal) 60 gal/day HW | Days of Service |
|---|---|---|
| 2:1 | 20 | 195 |
| 3:1 | 15 | 260 |
| 4:1 | 12 | 325 |
| 5:1 | 10 | 390 |
| 6:1 | 8.6 | 453 |

The water treatment method and system can be applied to any stream where improved scale control and partial softened water benefits are desired. However, as the life or capacity of the system will be directly proportional to the flow through it and therefore for an acceptable life in the resin bed between service exchanges, it is proposed to apply it only to the hot water supply in the home, or feed to several or one particular appliance in either a home or business.

Although the invention has been described with a certain degree of particularity, it should be understood that those skilled in the art can make various changes to it without departing from the spirit or scope of the invention, as hereinafter claimed.

Having described the invention, the following is claimed:

1. A water treatment apparatus for reducing the mineral scaling potential of water used in a heated appliance, comprising:
    a) an inlet for receiving feed water;
    b) a treatment tank containing a weak acid cation exchange resin in hydrogen form;
    c) a flow control device for communicating a first portion of said feed water received at said inlet to said tank while allowing a second portion of said feed water to bypass said tank via a bypass conduit;
    d) a flow control valve for controlling the flow of said first portion of said feed water to said treatment tank;
    e) a tank outlet passage communicating water treated by said treatment tank with said second portion of said feed water so that a mixture of untreated and treated feed water is delivered to an outlet;
    f) a sensor for sensing the pH of water delivered to said outlet.

2. A method for reducing the mineral scaling potential of water for use in a heated appliance, comprising:
    a) providing an inlet for receiving feed water for said appliance;
    b) dividing said feed water into a first portion and a second portion;
    c) communicating said first portion to a treatment tank containing a weak acid cation exchange resin in hydrogen form;

d) conveying said second portion through a bypass conduit whereby said second water portion bypasses said treatment tank;

e) after passing said first portion of said feed water through said treatment tank, recombining said first portion with said second portion and delivering said combined first and second portions to an outlet;

f) monitoring a pH of said first and second combined water portions and adjusting the amount of said first portion of water delivered to said treatment tank relative to said second portion in order to maintain a predetermined pH range in said combined first and second water portions.

3. The method of claim 2 further comprising the step of regenerating said weak acid cation exchange resin when the effectiveness of said resin falls below a predetermined level.

4. A method for reducing the mineral scaling potential in feed water for heated appliances comprising the steps of:
   a) providing an inlet for receiving feed water;
   b) providing a branch flow passage for conveying a portion of said feed water at said inlet to a weak acid cation exchange resin in hydrogen form;
   c) providing a bypass conduit for conveying a remaining portion of said feed water to a combined feed water passage;
   d) passing said one portion of said feed water through said weak acid cation resin to produce a treated portion of said feed water;
   e) combining said treated portion of said feed water with said remaining portion of said feed water, thereby delivering a blended feed water to an outlet of said combined feed water passage;
   f) adjusting an amount of feed water delivered to said weak acid cation exchange resin in order to arrive at a predetermined pH range for the blended feed water at said outlet.

5. The method of claim 4 further comprising the step of monitoring the pH of said blended feed water at said outlet and adjusting a ratio of said treated portion of said feed water to said remaining portion of said feed water in order to arrive at a desired blended feed water pH at said outlet.

6. A water treatment apparatus for reducing the mineral scaling potential of water delivered to a heated appliance, comprising:
   a) a feed water inlet for providing water to be treated to a main feed conduit;
   b) a bypass conduit for receiving a first feed water stream of water from said main feed conduit;
   c) a branch conduit communicating with said main conduit for receiving a second feed water stream;
   d) a treatment tank containing a weak acid cation exchange resin in hydrogen form having an inlet in fluid communication with said branch conduit and a tank outlet in fluid communication with a treated water conduit;
   e) a combined feed water passage communicating with a treatment apparatus outlet;
   f) said bypass conduit and treated water conduit in fluid communication with said combined feed water passage thereby delivering a blended feed water to said outlet, said blended feed water including untreated feed water conveyed by said bypass conduit and treated water treated by said treatment tank; and
   g) at least one flow control valve for controlling a ratio of a flow rate of first feed water stream to a flow rate of the second feed water stream delivered to said outlet, wherein the ratio is a function of the pH of said blended feed water at said outlet.

7. The apparatus of claim 6 wherein the at least one flow control valve includes a first flow control valve in said bypass conduit for controlling the flow rate of untreated feed water through said bypass conduit and a second flow control valve in said branch conduit for controlling the rate of flow of feed water to be treated by said treatment tank.

8. The apparatus of claim 7 wherein said flow control valves are adjustable.

9. The apparatus of claim 8 wherein said flow control valves are motor driven.

10. The apparatus of claim 8 further including a pH sensor for sensing pH at said outlet and a controller responsive to said sensor for operating said first and second flow control valves in order to control the pH of said blended feed water.

11. The apparatus of claim 8 further including pressure sensors for monitoring a pressure of the feed water delivered at said inlet and said blended feed water at said outlet, said controller responsive to said pressure sensors in order to control the degree of opening in the first and second flow control valves.

12. The apparatus of claim 6 wherein the at least one flow control valve includes a dual flow control valve for maintaining a constant ratio between the flow rate of said first feed water stream and the flow rate of second feed water stream and a flow meter for monitoring the flow rate at said outlet and a controller for adjusting said dual flow control valve in response to said flow meter.

13. A method for reducing the mineral scaling potential in feed water for heated appliances, comprising the steps of:
   a) determining an L.S.I. of available feed water;
   b) providing an inlet for receiving an inlet feed water stream;
   c) providing a dual flow control valve for splitting said feed water inlet stream into a bypass inlet stream and an inlet stream to be treated;
   d) conveying said inlet stream to be treated through a weak acid cation exchange resin in hydrogen form to produce a treated fluid stream;
   e) combining said treated fluid stream with said bypass inlet stream to produce a blended feed water stream delivered to an outlet;
   f) monitoring a flow rate of said blended feed water stream and adjusting said dual flow control valve to maintain a constant ratio between a flow rate of said bypass inlet stream and a flow rate of said inlet stream to be treated, wherein said ratio is a function of the L.S.I. determined in step a).

14. A method for reducing the mineral scaling potential from feed water in heated appliances comprising the steps of:
   a) providing an inlet for receiving feed water;
   b) providing a branch flow passage for conveying a portion of said feed water at said inlet to a weak acid cation exchange resin in hydrogen form;
   c) providing a bypass conduit passage for conveying a remaining portion of said feed water to an outlet;
   d) passing said one portion of said feed water through said weak acid cation resin to produce a treated portion of said feed water;
   e) combining said treated portion of said feed water with said remaining portion of said feed water, thereby delivering a blended feed water to said outlet, said water delivered to said outlet being a blend of said treated portion of said feed water and said remaining portion of said feed water;

f) adjusting an amount of said one portion of said feed water delivered to said weak acid cation resin in order to arrive at a predetermined L.S.I. range for the blended feed water at said outlet.

15. The method of claim 14 wherein said predetermined L.S.I. range is in the range of −0.6 to −1.4.

16. The method of claim 14 further comprising the step of allowing the CO2 content of said blended feed water at said outlet to be greater than the CO2 content of the feed water received at said inlet.

17. The method of claim 16 wherein said CO2 content of said blended water is at least twice the level of the CO2 content of the feed water received at said inlet.

18. The method of claim 14 wherein said one portion of said feed water is passed through said weak acid cation resin in a downflow direction.

19. The method of claim 14 wherein said one portion of said feed water is conveyed through said weak acid cation exchange resin in an upflow direction and said weak acid cation exchange resin comprises a fluidized bed.

20. A method for reducing the mineral scaling potential from feed water for a heating appliance that produces heated water comprising the steps of:
    a) providing an inlet for receiving feed water;
    b) providing a branch flow passage for conveying a portion of said feed water at said inlet to a weak acid cation exchange resin in hydrogen form contained in a tank;
    c) providing a bypass passage for conveying a remaining portion of said feed water to an outlet;
    d) passing said one portion of said feed water through said weak acid cation exchange resin to produce a treated portion of said feed water;
    e) combining said treated portion of said feed water with said remaining portion of said feed water, thereby delivering a blended feed water to said outlet, said water delivered to said outlet being a blend of said treated portion of said feed water and said remaining portion of feed water;
    f) adjusting the amount of feed water delivered to said weak acid cation exchange resin in order to arrive at a blended feed water for said heating appliance such that said heated water produced by said appliance has a predetermined L.S.I. range.

21. The method of claim 20 wherein said predetermined L.S.I, range is in the range of 0 to −0.75.

22. The method of claim 20 wherein said bypass passage is a conduit external to said tank.

23. A method for reducing the mineral scaling potential from feed water for a heated appliance that produces heated water comprising the steps of:
    a) determining an L.S.I. of available feed water;
    b) providing an inlet for receiving an inlet feed water stream;
    c) providing a dual flow control element for directing a first portion of said inlet feed water stream to a bypass passage and a second portion of the inlet feed water stream to a branch passage;
    d) conveying, via said branch passage, the second portion of the inlet feed water stream to be treated through a weak acid cation exchange resin in hydrogen form to produce a treated water stream;
    e) combining said treated water stream with said first portion of said inlet feed water stream to produce a blended water stream delivered to an outlet with a desired L.S.I. range; and,
    f) monitoring the flow rate of said blended water stream and adjusting said dual flow control element to maintain a constant ratio between a flow rate of said first portion of said inlet feed water stream and said treated water stream so said blended water stream delivered to said outlet is within said desired L.S.I range.

* * * * *